US005127453A

United States Patent [19]

Wingate-Hill et al.

[11] Patent Number: 5,127,453

[45] Date of Patent: Jul. 7, 1992

[54] APPARATUS FOR REMOVING BRANCHES FROM TREE TRUNKS

[75] Inventors: Robin Wingate-Hill, Queanbeyan; Ian J. MacArthur, Bungendore; William C. L. Gabriel, Curtin, all of Australia

[73] Assignee: Commonwealth Scientific and Industrial Research Organisation, Australia

[21] Appl. No.: 697,171

[22] Filed: May 8, 1991

[30] Foreign Application Priority Data

May 8, 1990 [AU] Australia .............................. PK0011

[51] Int. Cl.[5] ......................... B27L 1/00; A01G 23/02

[52] U.S. Cl. ................................ 144/2 Z; 144/208 F; 144/221

[58] Field of Search .................... 144/2 Z, 3.0, 208 R, 144/208 F, 218, 221, 340, 343, 341; 407/59, 63, 23, 24, 25, 26

[56] References Cited

U.S. PATENT DOCUMENTS

| | | | |
|---|---|---|---|
| 512,463 | 1/1894 | Bechtol | 144/221 |
| 2,693,208 | 11/1954 | Stewart | 144/221 |
| 2,969,816 | 1/1961 | Johnsa | 144/221 |
| 3,457,976 | 7/1969 | Andersson et al. | 144/221 |
| 4,344,470 | 8/1982 | Dubey | 144/2 Z |
| 5,022,446 | 6/1991 | Wingate-Hill et al. | 144/208 F |

FOREIGN PATENT DOCUMENTS

| | | | |
|---|---|---|---|
| 3813959 | 11/1989 | Fed. Rep. of Germany | 144/2 Z |
| 122151 | 7/1948 | Sweden | 144/208 F |

*Primary Examiner*—W. Donald Bray
*Attorney, Agent, or Firm*—Sughrue, Mion, Zinn, Macpeak & Seas

[57] ABSTRACT

When conventional mechanical equipment for removing branches or limbs from a tree trunk is used, stumps of the branches removed remain on the tree trunk. The present invention avoids the creation of such stumps when a trunk (or a length of a trunk) is being transported through a mill or compression debarking equipment and is simultaneously rotated. The invention uses an elongate helical milling head, mounted at the end of a support arm and rotated by a motor to remove the branches. The milling head axis is positioned parallel to the axis of the trunk with the cutting surface of the milling head close to the bark of the trunk. Normally a brace member is included to stiffen the mounting of the milling head. Preferably the milling head is formed as a plurality of short milling heads mounted colinearly and with their helical cutters aligned.

6 Claims, 2 Drawing Sheets

APPARATUS FOR REMOVING BRANCHES FROM TREE TRUNKS

TECHNICAL FIELD

This invention concerns the harvesting of timber. More particularly, it concerns apparatus for the removal of branches (also called "limbs") from the trunks, or from sections of the trunks, of trees, to facilitate the subsequent removal of bark from the trunks or sections of trunks, or to facilitate the stacking of cut lengths of trunks on a timber forwarder for transportation.

The apparatus of this invention was developed primarily as an optional feature to be included, if required, in the compression log debarking equipment that is described in the specifications of Australian patent application No.24,114/88 and its equivalent U.S. patent application Ser. No. 457,902. However, the "delimber" of the present invention may be used independently of that log debarking equipment (for example, in a mill which is arranged to transport logs and rotate them about their axes).

BACKGROUND TO THE INVENTION

A variety of techniques and equipments have been used to remove the limbs of trees prior to, or after, the felling of the trees. Perhaps the most fundamental method of removing limbs has been to use axes, manual saws or chain-saws. Such equipment can be used effectively in confined spaces and on steeply-sloping hillsides, where it is difficult to provide and operate mechanical delimbing equipment. The manual removal of branches is both labour intensive and time consuming. For this reason, mechanical delimbers have been developed and have been widely adopted in pine plantations. Thus manual removal of branches is now used only to a limited extent in pine plantations. However, there has been no satisfactory mechanical limb removal equipment for use with eucalypts.

In more detail, to remove the limbs from standing pine (and similar) trees in a plantation, "high pruners" and "tree shears" have been developed. A useful summary of the equipment available and used for pruning is provided in the paper by P. Wilkes and L. J. Bren, entitled "Radiata Pine Pruning Technology", published in *Australian Forestry*, volume 49, 1986, pages 172 to 180. This paper includes a reference to the equipment known as the "Tree Monkey", which is an automated pruner that, in use, is clamped around the base of a tree, from which position it spirals upwards on the tree trunk. A chainsaw, mounted on the equipment with its chain guide or bar vertical, is used to remove the limbs of the tree as they are encountered. When the tree trunk diameter reaches a predetermined minimum value, the "Tree Monkey" reverses direction and spirals back down the trimmed trunk. Unfortunately, this equipment is not noted for its reliability, and is not used on eucalypts, where often the limbs are present only near the top of the tree.

When a tree has been felled, the limbs may be removed by using equipment which effectively wraps three or more curved knives around the trunk of a tree. One of these knives is fixed; the other knives are moveable. The assembly of knives is then driven along the trunk, cutting through any branch encountered by a knife. The disadvantages of this approach to delimbing are (a) that a high energy input is required to drive the knife blades through the branches and along the trunk; (b) the wrap-around arrangement acts as a brake to the movement of the assembly (and thus contributes significantly to the energy input requirement); and (c) the inability of the curved knives to provide a true 360° close coverage of the trunk, with the result that stub ends of the severed limbs inevitably remain on the trunk.

Yet another example of the prior art approach to delimbing is described in the aforementioned specification of Australian patent application No. 24,114/88 namely the inclusion of a short chain-saw or circular saw in the tree felling assembly embodiment of the debarking equipment described in that specification. The short chain-saw or the circular saw is mounted above the debarking equipment, with the plane of the bar of the short chain-saw, or the plane of the circular blade, parallel to the direction of movement of the log or trunk through the debarking equipment. Using this equipment, branches are out from the trunk, close to it, as the log or trunk is moved past the chain-saw or circular saw.

A disadvantage of all of the mechanical prior art delimbing equipment is that although limbs can be removed fairly close to the trunk when the equipment is used, nevertheless there is always a stub end of the limb which remains, attached to and projecting from the trunk. These stub ends reduce the packing density of logs and trunks on timber forwarders. They also reduce the effectiveness of debarking equipment—and on occasions cause a log to jam in debarking equipment. Thus the presence of short stub ends of branches is economically disadvantageous to the logging industry.

DISCLOSURE OF THE PRESENT INVENTION

It is an object of the present invention to provide delimbing apparatus which, when incorporated into equipment which transports and simultaneously rotates tree trunks or logs, removes the limbs of a tree or log close to the trunk, after a tree has been cut or felled, and leaves substantially no stub end of a branch projecting from the trunk.

This objective is achieved by mounting a steel milling head of generally cylindrical shape having helical cutters on its outer surface (such a milling head being known as a helical milling head, but sometimes termed a helical mill or helical cutter) at the end of a support arm. A motor is used to rotate the milling head. When this combination of milling head, support arm and motor is incorporated into equipment that is adapted to transport and rotate a tree trunk or log, the axis of rotation of the milling head is parallel to the axis of the log or the tree trunk, and biasing means ensures that the support arm and the tree trunk or log are positioned so that there is always only a small distance between the bark of the trunk or log and the closest part of the outer surface of the milling head as the trunk or log is moved through the assembly and therefore moved past the milling head.

Thus, according to the present invention, there is provided apparatus for the removal of limbs from the felled or cut trunk of a tree or from a log, the apparatus being adapted to be mounted on an assembly through which a log or trunk is transported while the log or trunk is rotated about its axis, the apparatus comprising:

(a) a generally elongate and cylindrical milling head having helical cutters on its outer surface and an axis of rotation which is also the central axis of the milling head, the milling head being mounted at one end of a head support means with the axis of rotation of the milling head substantially parallel to the axis of the trunk or log; and (b) drive means to cause rotation of the milling head about its axis of rotation.

Normally the drive means will be a motor with a belt drive, but any other suitable drive connection to the milling head may be used.

When the apparatus is mounted on an assembly through which a log or trunk is transported and rotated, there will normally be associated bias means adapted to position the milling head and the trunk or log adjacent to each other with the cutting surfaces of the helical cutters close to the surface of the trunk.

When the apparatus of the present invention is included as a component of a compression log debarking equipment of the type described in the specification of Australian patent application No. 24,114/88, the milling head will be mounted for limited movement under the influence of the bias means, and will perform the delimbing as the trunk or log is rotated about its axis while it is simultaneously moved longitudinally past the milling head.

Preferably the milling head will comprise a plurality of short milling heads, adjacent to each other with their axes of rotation colinear.

In most applications, the milling head support means will be a support arm, and a bracing member will be provided to brace the end of the milling head which is remote from the support arm.

The rotation of the tree trunk or log relative to the milling head will normally be in a direction such that the milling head effectively performs a climb-milling operation. When the present invention is used in the aforementioned compression log debarker, this feature assists the rotation of the trunk or log and its movement through the debarking equipment.

A servo-controlled "depth gauge" arrangement, adapted to control the location of the milling head adjacent to the trunk, may be included in the delimber of the present invention if required.

Embodiments of the present invention will now be described, by way of example only, with reference to the accompanying drawings.

DETAILED DESCRIPTION OF THE ILLUSTRATED EMBODIMENTS

Figure 1:
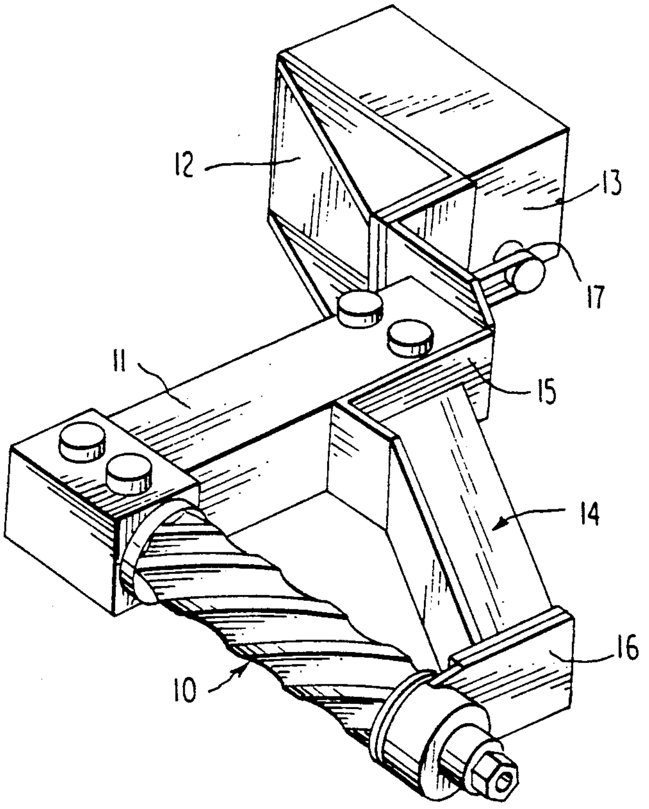
FIG. 1 is a partly schematic perspective view of a delimbing assembly adapted to be included in compression log debarking equipment.

The assembly illustrated in FIG. 1 includes a helical milling head 10 which is mounted at one end of a tubular support arm 11 of square cross-section. A motor mounting bracket 12 is connected to the other end of the support arm 11. A motor 13 (shown symbolically in dashed outline) is connected by a belt drive 17 which passes beside the tubular arm 11 to the axial shaft of the cutter 10, to rotate the cutter about its axis of rotation.

In a prototype of the present invention, the motor 13 was initially a 7.5 kW hydraulic motor. However, that motor, which rotated the cutter 10 at 2,000 rpm, has now been replaced with a more satisfactory motor of 32 kW. The more powerful motor is preferred for delimbers constructed in accordance with the present invention. The present motor in the prototype equipment rotates the cutter 10 at a speed of between 6,000 rpm and 7,000 rpm, but this rotation rate is not essential for successful operation of the present invention.

A bracing member 14, in the form of a second tubular arm, is rigidly connected at one end to the support arm 11 (using a bracket 15) and at the other end to the axial shaft of the helical cutter 10. The connection to the shaft of the cutter or milling head 10 is via a bearing supported by a plate 16 or similar member. Thus the delimber assembly shown in FIG. 1 is a rigid assembly of components.

Figure 2:
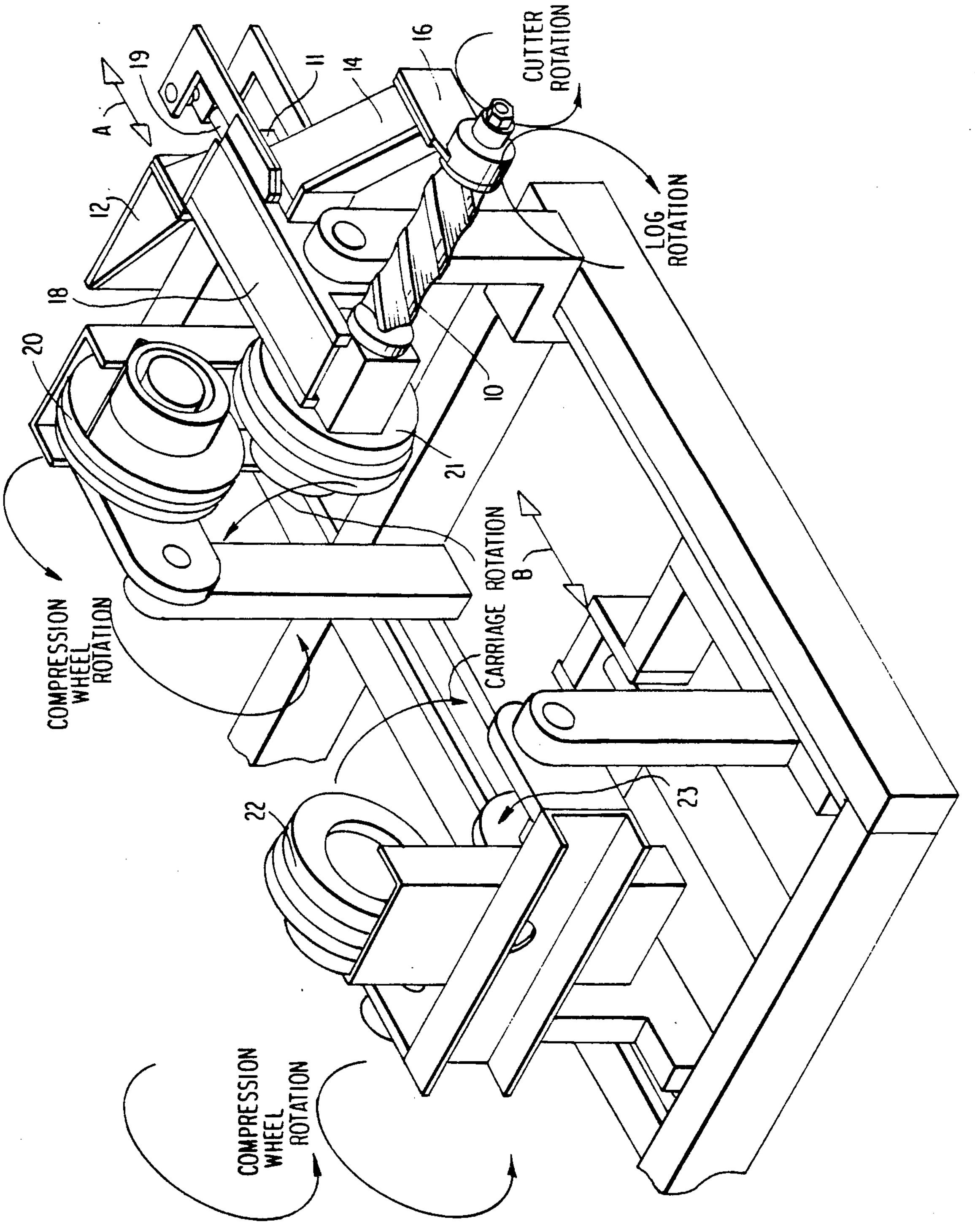
FIG. 2 shows the assembly of FIG. 1 installed in log debarking equipment.

When installed in log debarking equipment as shown in FIG. 2, to enable parallel delimbing of logs that are being compression debarked, the assembly of FIG. 1 should be mounted adjacent to a "bogie" carrier of the rollers of the debarking equipment, with the axis of rotation of the cutter or mill 10 aligned with the midline between the compression rollers 20 and 21 of one of the bogies. With this mounting arrangement, the axis of rotation of the milling head 10 will remain parallel to (and closely adjacent to) the log surface as the pitch angle of the rollers 20 and 21 is varied.

In the embodiment illustrated in FIG. 2, the support arm 11 is mounted for reciprocal movement in the longitudinal direction of a guide member 18. This direction of movement is shown by the double arrow A. The movement of the support arm 11 relative to the guide member 18 is effected under the influence of a hydraulic ram 19 which is connected to the assembly of FIG. 1. Normally the hydraulic ram 19 will be a relatively low pressure ram. In addition to this mechanism for controlling the position of the cutting surfaces of the cutting head 10 relative to the surface of a log that is being debarked, there is the biasing of the "bogie" carrying the pair of compression rollers 22 and 23 towards the "bogie" carrying rollers 20 and 21. This biasing—shown by the double arrow B—and the consequential movement of the rollers 22 and 23, which is also effected by an hydraulic ram, assists in locating the log and the cutting surfaces of the mill 10 in a required position relative to each other.

In a preferred embodiment of the delimber, when used in a debarking equipment head, an optional "depth gauge" will be provided, to maintain the correct (and close) spacing between the cutter and the surface of the log. Various forms of "depth gauge" are known. One convenient form of "depth gauge" uses an hydraulic servo system (similar to that used in copying lathes). This type of "depth gauge" is preferred when logs with many branches are being delimbed.

When the delimber of the present invention is to be used with a log debarking head as shown in FIG. 2, the length of the milling head 10 will be chosen to be sufficient to ensure that when the compression rollers of the debarking equipment have their supporting "bogies" titled so that the log travels through the debarker at its maximum rate (usually when the "bogies" are tilted by 45°), the cutting surfaces will encounter all of the limbs of the log. In the prototype equipment, this distance was about 300 mm. Accordingly, in the expectation that limbs having a thickness in excess of 100 mm would not be encountered, a milling head 10 having a cutting length of 400 mm has been adopted for the prototype equipment.

Figure 3:
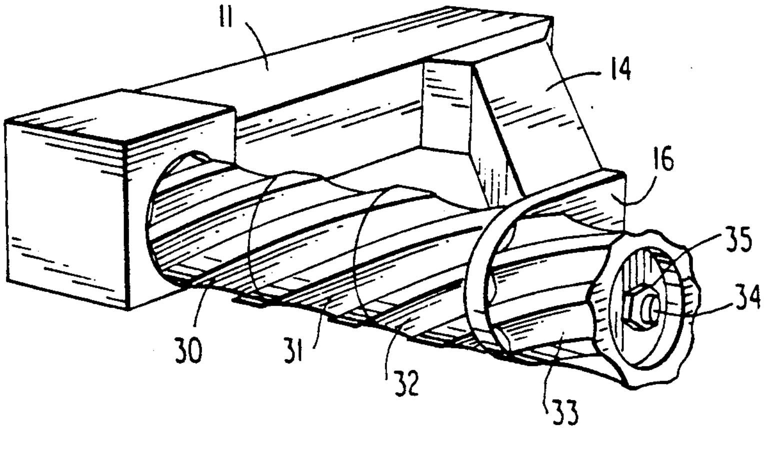
FIG. 3 is a partly schematic perspective view of a preferred composite milling head.

In practice, rarely will a single milling head be used as the cutter 10. Normal practice will be to construct the helical cutter 10 as a composite milling head formed by a plurality of shorter steel milling heads, mounted adjacent to each other on a single shaft or axle. Keyways and keys in the bores of the shorter milling heads and the supporting drive shaft are used to match up the helical cutting surfaces and ensure their continuity along the length of the composite helical cutter. Such an arrangement is shown in FIG. 3. This milling head construction is used in the prototype equipment referred to above. As will be seen, the composite milling head of FIG. 3 (and thus of the prototype equipment) has four helical milling heads 30, 31, 32, and 33, each approximately 100 mm long, aligned by keyways on a single central shaft 34, held in place by a nut 35. The bracing arrangement, including the plate 16 and the bracing member 14, is connected to the shaft 34 between the helical mills 32 and 33. The outer end of the milling head 33 is recessed so that the nut 35 does not project beyond the end of the composite milling head. This arrangement ensures that any branch which contacts the end of the helical milling head 33 will be severed by the cutting surfaces of the head 33 and will not foul the nut 35. Fouling of the nut 35 could cause a blockage of the delimbing apparatus or the log transportation and rotation equipment.

Those familiar with logging equipment will appreciate that a specific embodiment of the present invention has been illustrated in the drawings and is described above, and that variations to, and modifications of, that embodiment may be made without departing from the present inventive concept.

We claim:

1. Apparatus for the removal of limbs from a log, said apparatus being adapted to be mounted on an assembly through which said log is transported while said log is rotated about its axis, said apparatus comprising:

- a generally elongate and cylindrical milling head having helical cutters on its outer surface, said milling head being mounted on a shaft for rotation with said shaft being located at one end of a head support arm, said head support arm extending generally at right angles to the axis of rotation of the milling head, and the axis of rotation of the milling head being substantially parallel to the axis of said log;
- drive means to cause rotation of the milling head about its axis of rotation, said drive means comprising a motor mounted adjacent to the end of the support arm which is remote from the milling head, said motor being operatively connected to said shaft; and
- a brace member extending between the support arm and said shaft on which the milling head is mounted, said brace member being connected to the end of the support arm which is remote from said milling head.

2. Apparatus as defined in claim 1, in which said support arm is hollow and a belt drive mechanism passing inside the hollow support arm connects a drive shaft of the motor with the shaft on which the milling head is mounted.

3. Apparatus as defined in claim 1, in which said milling head is a composite milling head comprising a plurality of short milling heads, each short milling head having helical cutters on its outer surface, the helical cutters of each short milling head being aligned with the helical cutters of its adjacent milling head or heads.

4. Apparatus as defined in claim 3, in which said brace member is connected to said shaft via a bracket positioned between the two short milling heads most remote from said support arm.

5. Apparatus as defined in claim 1, mounted in an assembly through which a log is transported and simultaneously rotated, and including bias means adapted to position the milling head and the log adjacent to each other with the cutting surfaces of the helical cutters close to the surface of the log.

6. Apparatus as defined in claim 5, in which said bias means comprises at least one hydraulic ram.

* * * * *